March 16, 1965 R. B. ADAMS 3,173,437
TRANSDUCERS
Filed Sept. 22, 1961 3 Sheets-Sheet 1

INVENTOR.
ROBERT B. ADAMS
BY
ATTORNEY

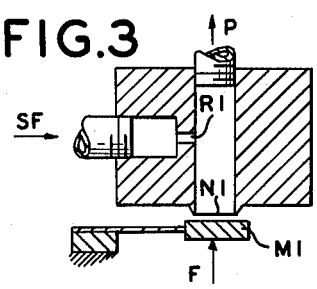
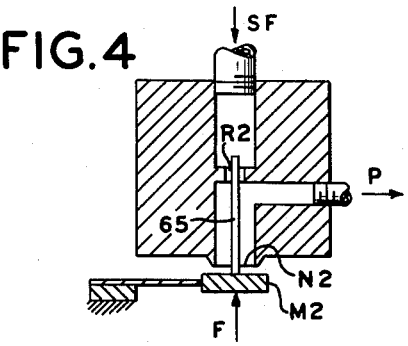
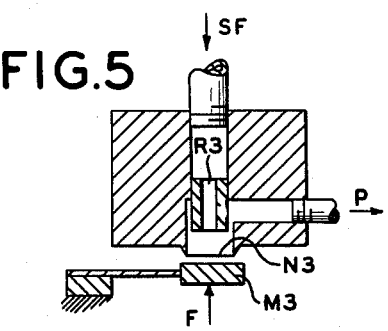
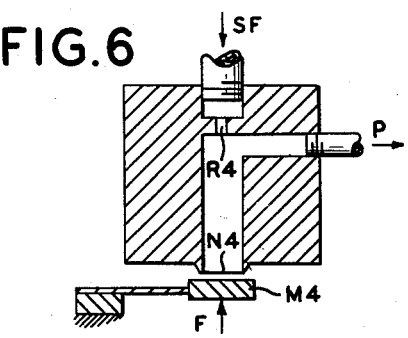
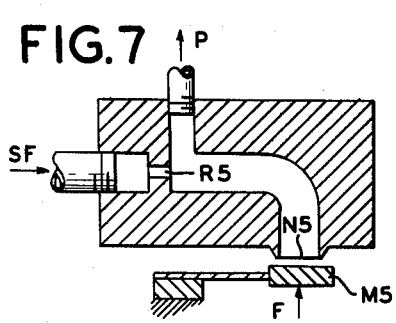
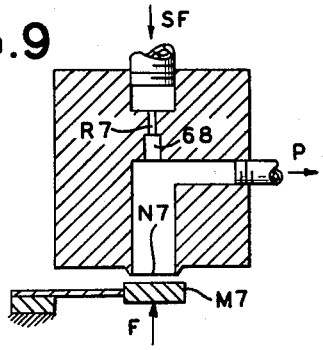
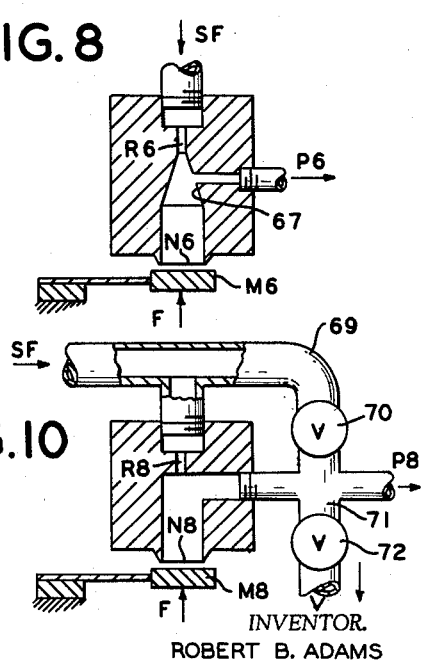

March 16, 1965  R. B. ADAMS  3,173,437
TRANSDUCERS
Filed Sept. 22, 1961  3 Sheets-Sheet 3

INVENTOR.
ROBERT B. ADAMS
BY
ATTORNEY 3,173,437
TRANSDUCERS
Robert B. Adams, Abington, Pa., assignor to Moore Products Co., Philadelphia, Pa., a corporation of Pennsylvania
Filed Sept. 22, 1961, Ser. No. 140,089
11 Claims. (Cl. 137—82)

This invention relates to transducers and more particularly to transducers having a pneumatic balancing circuit either of the force balance or of the motion balance type.

In conventional force balance fluid pressure transmitters in which the supply fluid is supplied through a restriction to a nozzle and escapes to a lower pressure region, which may be the atmosphere, through a clearance between the nozzle and its seating member, the transmitter pressure is affected by changes in the supply pressure so that there is a departure from the desired proportionality.

It is the principal object of the present invention to provide improvements in transducers having pneumatic balancing circuits with nozzles in which changes in the supply pressure are effective in the nozzle but are not effective in the transmitted output pressure.

It is a further object of the present invention to provide an improved electric to pneumatic transducer in which a nozzle is employed, the transmitted output pressure from the nozzle not being affected by changes in the supply pressure to the nozzle over a relatively wide range.

It is a further object of the present invention to provide improvements in pneumatic circuits having a nozzle with a supply of pressure fluid to the nozzle with a transmitted pressure take off in which the transmitted pressure is not affected by changes in the supply pressure.

Other objects and advantageous features of the invention will be apparent from the description and claims.

The nature and characteristic features of the invention will be more readily understood from the following description, taken in connection with the accompanying drawings forming part thereof, in which:

FIG. 3 is a diagrammatic view of a conventional force balance transducer which has been included for purposes of explanation of the invention;

FIG. 4 is a diagrammatic view of another form of force balance transducer for purposes of explanation;

FIG. 5 is a diagrammatic view of another form of force balance transducer for purposes of explanation;

FIG. 6 is a diagrammatic view of another form of force balance transducer operating in accordance with the invention;

FIG. 7 is a diagrammatic view of another form of force balance transducer operating in accordance with the invention, with the restriction separated further from the nozzle seat;

FIG. 8 is a diagrammatic view of another form of force balance transducer operating in accordance with the invention showing the effect of variations of location of the transmitted pressure take off;

FIG. 9 is a diagrammatic view similar to FIG. 8 but showing a modification of pressure take off location;

FIG. 10 is a diagrammatic view showing provisions for augmenting or reducing the compensating effect provided in the form of transducer shown in FIG. 6;

It should, of course, be understood that the description and drawings herein are illustrative merely, and that various modifications and changes may be made in the structure disclosed without departing from the spirit of the invention.

Like numerals refer to like parts throughout the several views.

Figure 1:
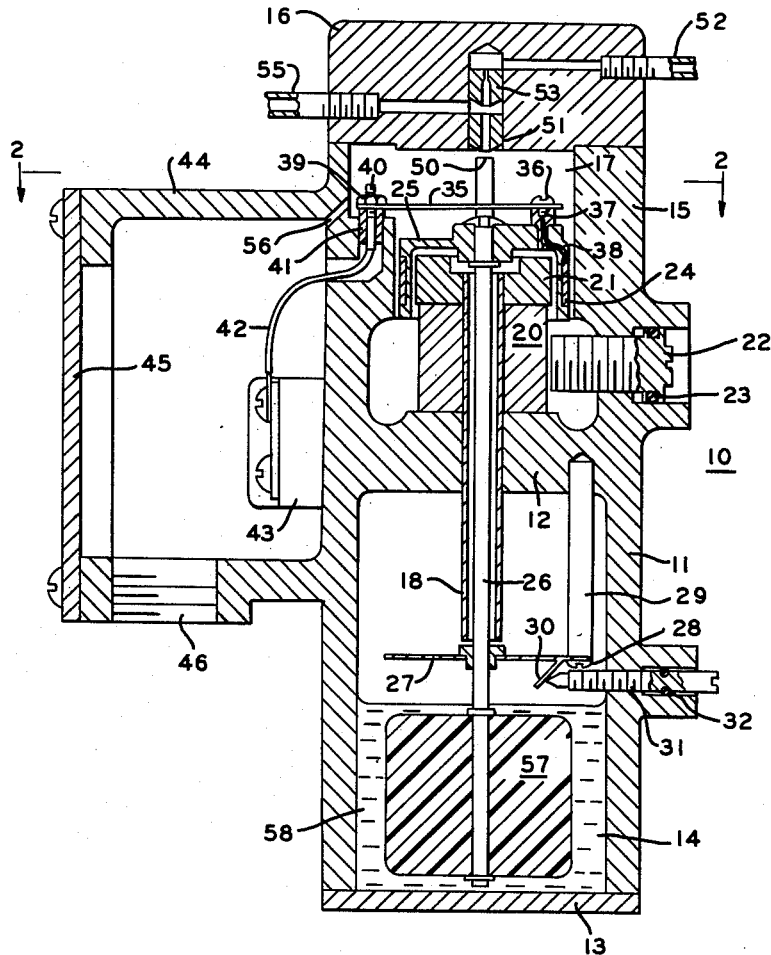
FIG. 1 is a view in vertical section, and partly diagrammatic, showing an electric to pneumatic transducer to which the present invention is particularly applicable.
Figure 2:
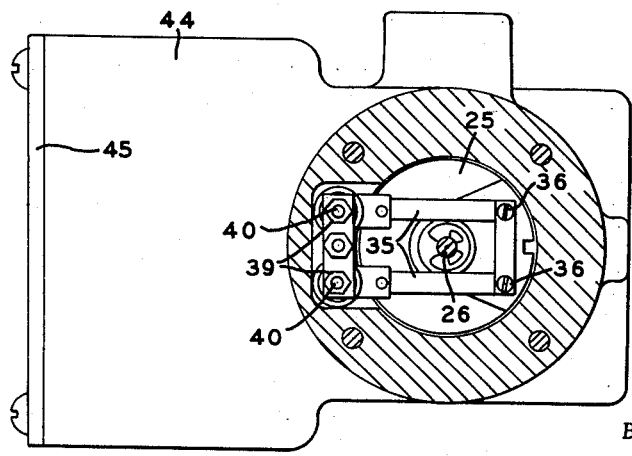
FIG. 2 is a horizontal sectional view taken approximately on the line 2—2 of FIG. 1.

The present invention is particularly adaptable for use with an electric to pneumatic transducer as shown in FIGS. 1 and 2. In that structure a main housing 10 of generally cylindrical shape is provided having a lower hollow section 11 with a central partition 12 and a bottom wall 13 therebelow enclosing a lower interior chamber 14.

The upper hollow section 15 of the main housing 10 is closed by an upper housing closure section 16 which is secured in position on the top of the housing 10 and provides an upper boundary of an upper interior chamber 17. The chamber 17 has, in the interior thereof, a fixed central mounting tube 18, preferably of non-magnetic responsive material such as aluminum or stainless steel, which extends vertically in the upper chamber 17, downwardly through the partition wall 12, and into the lower chamber 14.

Mounted on the tube 18, within the upper chamber 17 and on the top face of the partition 12, a magnet 20 is provided preferably of ultra high magnetic intensity material, available under the name "Alnico," and in the form of a ring. A pole ring 21 threaded on the upper end of the tube 17 and forming part of the magnetic circuit retains the magnet 20 in place.

An adjustable plug 22 of magnetic responsive material is threaded in the side wall of the upper section 15 of the housing 10 above the partition wall 12 and extending radially into the chamber 17 towards the magnet 20 can be provided to short circuit some of the flux from the magnet 20 to alter the range of sensitivity of the device.

The plug 22 is accessible for manual adjustment from the exterior of the housing 10 and is preferably provided with a packing ring 23, such as an O-ring, for preventing fluid leakage.

The pole piece 21 is preferably spaced inwardly from the side wall of the chamber 17 and a cylindrical coil 24 of wire, mounted on a cup shaped coil support plate 25 is provided for movement vertically with respect to the pole piece 21.

The coil support plate 25, of non-magnetic responsive material, is preferably fixedly mounted on a rod 26, also of non-magnetic responsive material, such as aluminum or stainless steel.

The rod 26 extends through the tube 18, and is supported in the chamber 14 by a lower leaf spring 27. The leaf spring 27 is secured at one end by a stud 28 to a post 29 in the chamber 14. The post 29 extends downwardly from the partition 12 in the chamber 14. The spring 27 has an inclined ear portion 30 projecting therefrom for engagement by an exteriorly accessible screw 31 mounted on the side wall of the lower section 11 of the housing 10. The screw 31 preferably has a groove with a packing 32 such as an O-ring, for preventing fluid leakage.

The coil support plate 25 is preferably supported by a pair of upper leaf springs 35 which are secured thereto by studs 36 extending into insulated posts 37. The posts 37 have conductors 38 carried therein which are connected to the ends of the winding of the coil 24. The leaf springs 35 provide conductors for energization of the coil 24 and are held by nuts 39 on hollow threaded posts 40 in insulating sleeves 41 in the housing 10. Insulated conductors 42 extend through the posts 40 to a connection block 43 mounted within a junction box 44. The junction box 44 provided on the side of the housing 10 has an access cover 45 and an opening 46 for input conductors (not shown) leading to the connection block 43.

The upper end face 50 of the rod 26 is preferably flat for cooperation with a sharp edged nozzle 51 mounted in the upper closure section 16. The nozzle 51 has a fluid supply connection 52 communicating therewith through a restriction 53. The fluid supply connection 52 is connected to a suitable source of pressure regulated and filtered fluid, such as air.

An output connection 55 is provided in the closure section 16 which is connected between the nozzle 51 and the restriction 53 for the transmission of the nozzle pressure to any suitable equipment, such as an indicator, recorder, controller, or pneumatic relay responsive to the transmitted pressure.

The details of construction of the restriction 53 and nozzle 51 are hereinafter more fully referred to.

In the side wall of the upper section 15 of the housing 10 a vent 56 is provided for permitting the escape of air exhausted from the nozzle 51. The vent 56 preferably communicates with the junction box 44 and provides a purging action.

It will be noted that the sleeve 18 extends a substantial distance into the chamber 14 towards the location at which the lower leaf spring 27 is connected to the rod 26 and that the rod 26 extends therebeyond toward the bottom wall 13. The rod 26 has secured to the lower end thereof a float 57, of any desired type. The lower part of the chamber 14 to and above any position which can be taken by the float 57 is filled with a liquid 58 of relatively low viscosity, such as light oil.

The weight of the liquid 58 displaced by the float 57 is such that it is substantially equal to the entire effective weight of the moving system, including the float 57, the rod 26, the coil 24, the coil support plate 25, the upper leaf spring 35 and the lower leaf spring 27.

The function of the float 57 is described in detail in the application of Coleman B. Moore, filed September 18, 1961, Serial No. 138,971, now Patent No. 3,126,026, but the float is not a part of the present invention.

Referring now more particularly to FIGS. 3 to 14, inclusive, in the transducers there shown the source of supply pressure fluid is identified as SF, the restrictions as R, the nozzles as N, the seating members as M, and the transmitted pressure as P, followed by separate identifying characters, and the forces applied on the seating members M are identified as F.

Referring now more particularly to FIG. 3, a conventional force balance transducer as heretofore available is there shown in which an input force F, which may be a fluid pressure, is effective on a movable member M1 and a supply of pressure fluid SF is delivered through a restriction R1. The transmitted or take off pressure P will be equal to the force at F divided by the effective area of the nozzle N1 since at equilibrium the nozzle seat member M1 will have equal forces acting on opposite side thereof. An increase in the force F will tend to close the nozzle N1 causing the transmitted pressure P to increase until the nozzle clearance has been restored enough to exhaust the fluid as fast as it is supplied through the restriction R1. In a transducer as shown in FIG. 3 an increase in supply fluid pressure at SF will cause a greater flow through the restriction R1. This greater flow will require a greater clearance at the nozzle N1 to exhaust the increased flow but to provide this greater clearance requires moving the nozzle seat away from the nozzle N1 against the resilence of its supporting member and such action will require a force which can only come from an increase in the transmitted or take off pressure P.

In FIG. 4 there is illustrated a transducer in which the force required to open the clearance at the nozzle N2 is furnished by a piston like extension 65 from the nozzle seating member M2 that is subject to the supply fluid pressure SF. The orifice R2 in series with the supply fluid connection SF and upstream of the nozzle N2 is in surrounding relation to the extension 65. The area of the piston extension 65 may be selected so that the increase in pressure of the supply fluid SF acting in the area of the extension 65 would be expected to provide the force required to reposition the nozzle seating member M2. Tests of this structure indicated that there was in fact a greater effect than could be accounted for by the area of the extension 65 and was ascertained to be due to the velocity energy of the fluid flowing in the restrictor R2, which by its impingement on the nozzle seating member M2 as a jet provided additional force to open the nozzle upon an increase in the supply fluid pressure CF.

Upon dispensing with the extension 65 the velocity energy of the jet was thus made available with the transducer shown in FIG. 5 through the restriction R3.

It has been ascertained that direct impingement of the jet on the nozzle seat is not necessary so long as the equivalent pressure head is effective on the nozzle seating member M.

In FIG. 6 a system in accordance with the invention is shown in which there is sufficient length of passageway between the restriction and the nozzle seating member M4 for the jet from the restriction R4 to expand and convert its velocity to pressure head which is effective on the nozzle seating member M4. The transmitted pressure or pressure take off connection by being located in a region where the expansion and conversion of the jet have not occurred is not subject to the velocity head of the jet.

In FIG. 7 the restriction R5 is shown as removed still further from the nozzle seating member and so that the restriction R5 does not even face the nozzle seating member M5. The advantages of the invention are still available.

In FIG. 8 the connection between the restriction R6 and the nozzle N6 is shown as including a Venturi throat 67 representative of the action which is occurring. From this, it will be seen that by selection of the location of the transmitted or pressure take off P6 the effect of the velocity of the jet may be varied. The effect would be a maximum if the take off P6 were close to the most restricted part and would disappear entirely if the take off P6 were at the largest diameter of the throat 67. If the maximum effect is more than is needed to exactly compensate for the supply pressure change for a particular set of conditions, the output pressure connections P6 would be located between the extremes noted above.

In FIG. 9 structure is included so that the partial expansion at the restriction R7 is followed by a recovery section 68 of easier configuration to construct, it being in thet form of a straight bore longitudinally axially aligned with the restriction R7. This is essentially the structure shown in FIG. 1.

In FIG. 10 there is shown an arrangement suitable for use with the transducer illustrated in FIG. 6 and includes the provision of a bypass connection 69 with a needle valve 70 therein extending from the supply fluid connection SF to the presure take off connection P8 and the nozzle N8, and a bypass connection 71 with a needle valve 72 therein extending from the pressure take off connection P8 to the atmosphere. If the needle valve 70 is opened with the needle valve 72 closed some of the flow will be bypassed around the restriction R8 and the jet will then only furnish part of the flow, with reduced effect as compared with transducer of FIG. 6.

If the needle valve 72 is open and the needle valve 70 is closed, venting some of the flow from the restricting R8, then the jet would represent more flow than necessary to supply the nozzle N8 and the compensating effect would be greater than with the transducer of FIG. 6.

Figure 11:
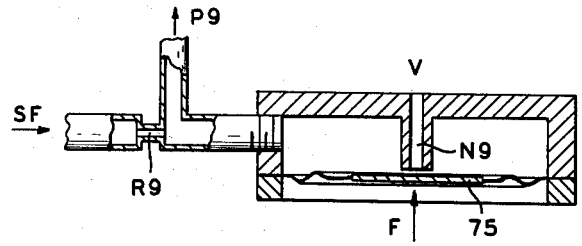
FIG. 11 is a diagrammatic view showing another form of force balance transducer operating in accordance with the invention where a larger area than that available at the nozzle is required for rebalancing.

In the transducers in accordance with the invention heretofore referred to the rebalancing area for the input force was that of the nozzle N and the force input F was necessarily limited. In FIG. 11 there is shown a diaphragm transducer of the direct nozzle type in which a movable wall 75 of an expansible chamber element such as a diaphragm, bellows, or piston and cylinder, is movable with respect to the nozzle N9 for controlling the discharge to atmosphere. Partial or total closure of the nozzle N9 causes an increase in pressure on the inner side of the pressure responsive wall 75 which urges it in a direction to open the nozzle N9 either directly as shown or indirectly through an intervening linkage (not shown). An increase in the supply fluid pressure SF increases the pressure acting on the wall 75 because of the increased velocity head of the jet through the restriction R9 without requiring any increase of the static pressure at P9. The increased pressure on the interior of the wall 75 opens the nozzle N9 to exhaust the additional fluid without any change in the output pressure P9.

Figure 12:
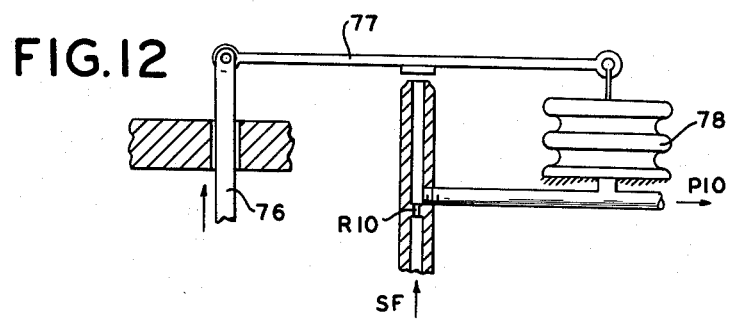
FIG. 12 is a diagrammatic view similar to FIG. 11 but showing the application to a motion balance system.

In FIG. 12, a transducer is shown which is similar to that of FIG. 11 but with motion balancing of the input rod 76 through a link 77 by the pressure applied in the bellows 78, with controlled discharge at the nozzle N10 and with the transmitted pressure or take off connection P10 having its pressure unaffected by the jet action from the restriction R10.

Figure 13:
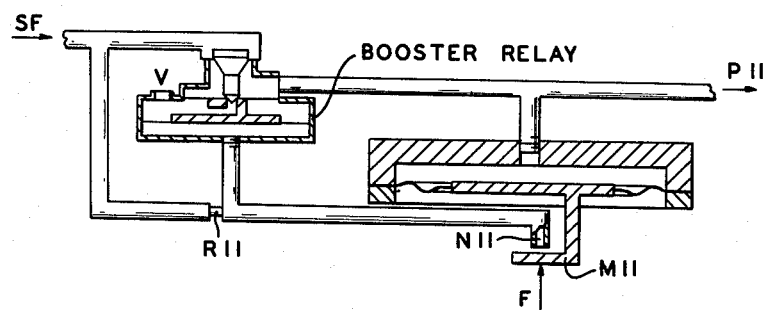
FIG. 13 is a diagrammatic view of a transducer in accordance with the invention with a booster pilot valve embodied therein with an atmospheric nozzle.

In FIG. 13, a transducer is shown in a circuit having a nozzle N11 discharging to atmosphere and with a booster relay BR of well known type included therein. Here again, the pressure at the transmitted or the pressure take off connection P11 is free from variations attendant on changes of supply pressure. Upon an increase in pressure of the supply pressure fluid the jet action from the restriction R11 causes a build up of pressure at the nozzle N11 without an attendant build up of pressure to the booster relay and therefore does not cause any change in the output pressure at the connection P11. This pressure increase at the nozzle N11 effects the discharge of the additional fluid without any undesired movement of the nozzle seating member M11.

Figure 14:
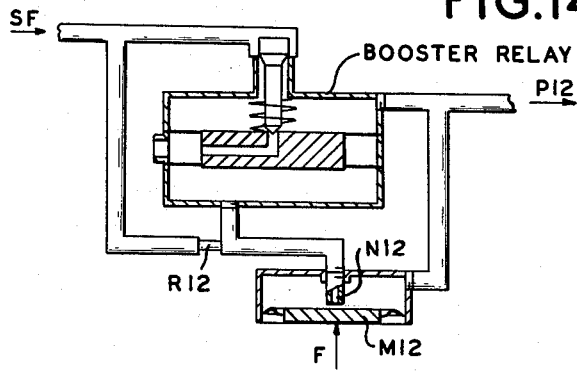
FIG. 14 is a diagrammatic view similar to FIG. 13 but showing another form of circuit.

In FIG. 14, a transducer is shown in a circuit having a nozzle N12 with a feed back of the transmitted pressure from the fluid pressure connection P12 for repositioning or rebalancing the nozzle esating member M12, the booster relay having a controlled bleed to atmosphere.

Upon an increase in pressure of the supply pressure fluid the action is similar to that previously explained with respect to FIG. 13. As the supply fluid pressure increases there is a greater discharge through the restriction R12 which requires a greater discharge through the nozzle N12 and if the pressure at N12 increases the additional pressure is effective for the jet effect without undesired movement of the nozzle seating member M12.

The mode of operation with particular reference to FIGS. 1, 2 and 9 will first be referred to.

Current supplied through the conductors 42 and the leaf springs 35 is effective in the coil 24 to set up a magnetic field in the coil 24. This field reacts with the magnetic field which includes the magnet 20 in the main housing 10 surrounding the coil 24 and the pole piece 21 to produce an upward axial force which is applied by the coil support plate 25 to the rod 26. The effect of this force is to reduce the clearance between the face 50 of the rod 26 and the nozzle 51 and restrict the flow of fluid from the nozzle 51.

The pressure inside the nozzle 51 increases until the downward force applied at the nozzle 51 against the face 50 is substantially equal to the force induced by the coil 24.

With the increased pressure the rod 26 is forced back almost to its original position and further rise of the pressure in the nozzle 51 is terminated.

If the effective area of the nozzle 51 is constant over the entire range of nozzle-to-seat clearance required in balance over the entire range of operation then the relationship between the nozzle pressure and the coil current will be linear.

The nozzle back pressure is effective through the outlet connection 55 for direct transmission to other devices such as an indicator, recorder, controller, pneumatic relay, or the like.

The vent 56 provides for escape of air exhausted from the nozzle 51 and the vent 56 by its communication with the junction box 44 provides a purge.

In addition to the particular utilization of the present invention in connection with the transducer shown in FIGS. 1 and 2, a wider applicability is available.

In the forms of the invention illustrated particularly in FIGS. 6 to 14, inclusive, other structures but related modes of operation are shown in which the pressure take off or transmitted pressure is free from variations in the supply pressure.

I claim:

1. In a transducer, a connection to a supply of pressure fluid, a nozzle, a member movable with respect to said nozzle responsive to a variable for controlling the discharge from said nozzle, a connection from said supply connection to said nozzle having a restriction therein for delivering fluid with substantial kinetic energy, a kinetic to potential energy conversion section between said restriction and said nozzle, and a pressure take off connection in said conversion section spaced from said nozzle and in closely spaced relation to said restriction and at a location where the pressure at said take off connection is lower than the pressure at said nozzle.

2. A transducer as defined in claim 1 in which said pressure take off connection has a take off pressure responsive fluid pressure transmitting device connected thereto.

3. A transducer as defined in claim 1 in which said conversion section is an elongated passageway of larger diameter than said restriction.

4. A transducer as defined in claim 1 in which said conversion section is elongated and said restriction is out of alignment with said nozzle.

5. A transducer as defined in claim 1 in which said conversion section includes a bore of larger diameter than the restriction and coaxial therewith.

6. A transducer as defined in claim 1 in which a force responsive member is provided in alignment with an extension of the longitudinal axis of the restriction.

7. A transducer as defined in claim 1 in which a variable bypass is provided around said restriction.

8. A transducer as defined in claim 1 in which a variable vent is provided from said presure take off connection to atmosphere.

9. A transducer as defined in claim 1 in which said movable member includes a movable closure for a chamber and said nozzle connects said chamber and the atmosphere.

10. A transducer as defined in claim 1 in which a fluid pressure transmitter is provided against which the take-off pressure is applied as a control pressure and the output pressure of the pressure transmitter is applied against the movable member in opposition to the variable force applied thereon.

11. A transducer as defined in claim 1 in which a pressure responsive chamber having a movable wall is provided to which said take-off connection is connected and a mechanical connection is provided between said movable wall and the movable member.

References Cited by the Examiner
UNITED STATES PATENTS

| | | | |
|---|---|---|---|
| 2,767,725 | 10/56 | Long | 137—82 XR |
| 2,800,136 | 7/57 | Bowditch | 137—85 |
| 2,888,941 | 6/59 | Grogan | 137—85 XR |
| 3,021,865 | 2/62 | Beckett | 137—82 XR |

ISADOR WEIL, *Primary Examiner.*

WILLIAM F. O'DEA, *Examiner.*